Figure 3:
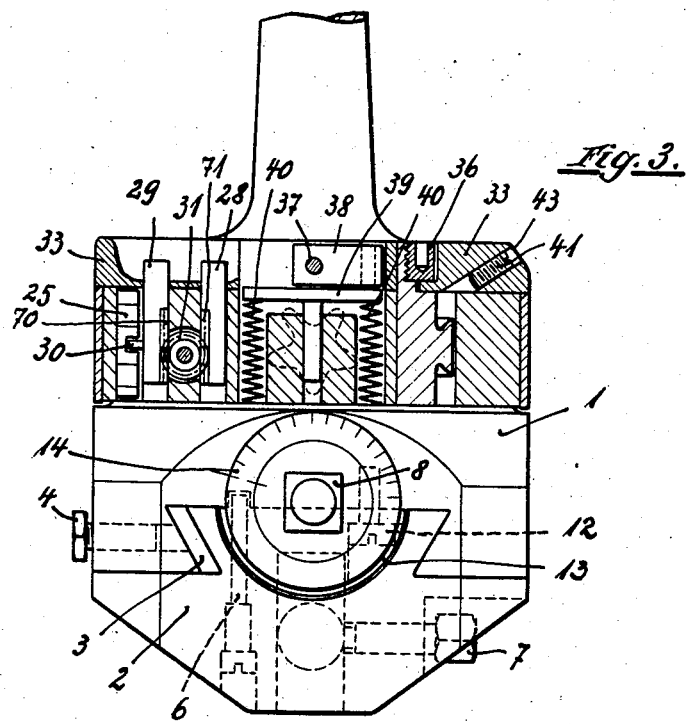

July 30, 1940.  WOHLHAUPTER  2,209,867
MACHINE TOOL
Filed Nov. 12, 1938  2 Sheets-Sheet 1
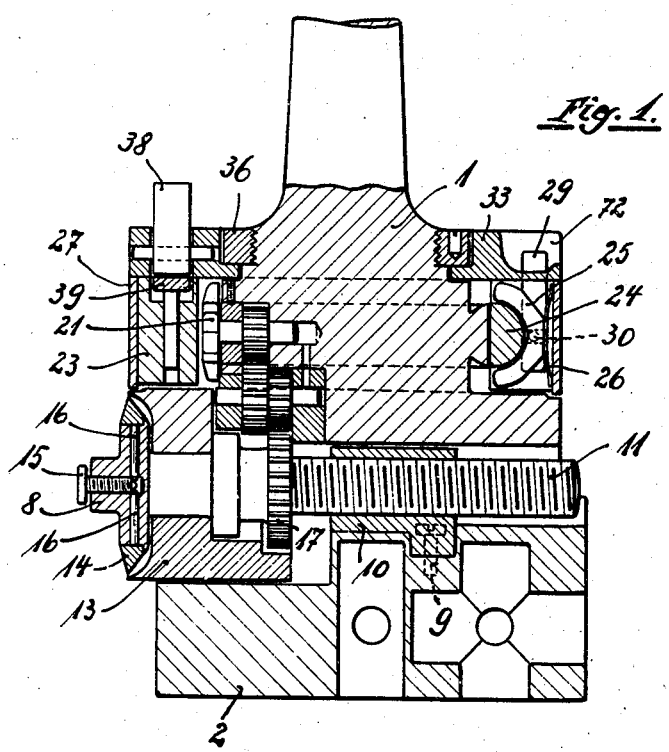
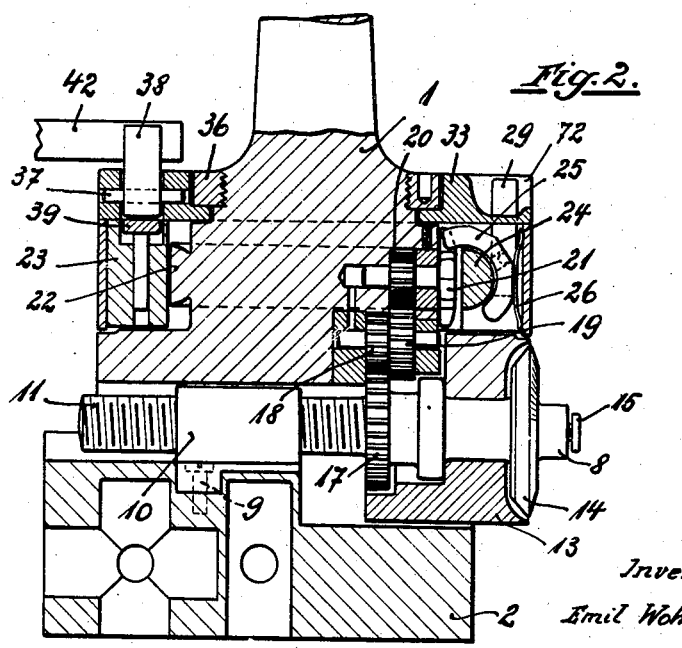
Inventor:
Emil Wohlhaupter
by Michauy & Michauy
Attys.

July 30, 1940. E. WOHLHAUPTER 2,209,867
MACHINE TOOL
Filed Nov. 12, 1938 2 Sheets-Sheet 2

Inventor:
Emil Wohlhaupter
by Michaelis & Michaelis
Attys.

Patented July 30, 1940

2,209,867

UNITED STATES PATENT OFFICE 2,209,867

MACHINE TOOL

Emil Wohlhaupter, Stuttgart-Feuerbach, Germany

Application November 12, 1938, Serial No. 240,123
In Germany July 31, 1937

4 Claims. (Cl. 279—6)

This invention relates to cutter heads and more especially to devices of this kind in which there is arranged in the body of the cutter head or chunk to be fixed to the spindle of the machine tool an axially displaceable cross slide carrying the tool which on being displaced in radial direction enables the cutting edge of the tool to be spaced differently from the center of the cutter head or chuck.

Cutter heads and turn-out chucks are known in which during the operation of the machine tool, a feed ring, which can be fixed in position during revolution of the cutter head or chuck, moves, by means of a finger, a feed wheel and the cross slide. Hitherto it was impossible to change the speed of transversal movement of the cross slide during the operation of the machine. In order to reverse the direction of movement of the slide another feed ring, adapted to be fixed in position and connected with feed fingers had to be provided.

It is an object of my invention to enable the direction and speed of movement of the cross slide to be changed.

I obtain this by arranging the fingers on the feed ring for angular movement, by means of a push button or the like, in such manner, that they can be made to engage either one or the other side of the respective feed wheel or may be held out of engagement with the wheel altogether. According as one or a plurality of the fingers of the wheel are made to act on the wheel, the speed of movement of the cross slide can further be changed during operation.

In the drawings affixed to this specification and forming part thereof an embodiment of my invention is illustrated diagrammatically by way of example.

In the drawings

Figure 4:
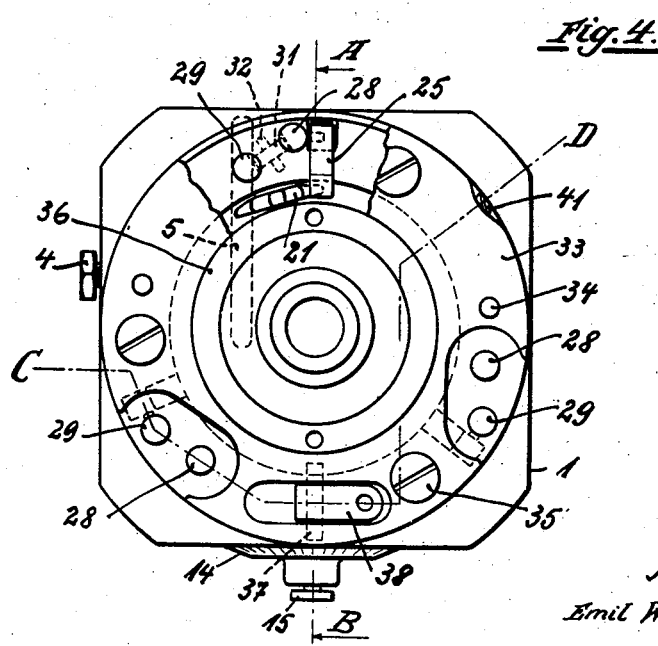

Fig. 1 is an axial section on the line A—B in Fig. 4, showing the parts in the position corresponding to automatic feed, Fig. 2 is a similar axial section, however viewed from the other side with the feed thrown in, Fig. 3 is an axial section on the line C—D in Fig. 4 and Fig. 4 is a plan view corresponding to Fig. 3.

Referring to the drawings, 1 is the body of the cutter head or chuck, this chuck being arranged to be fixed for instance by means of a conical shaft in the working spindle. 2 is the cross slide which is guided in the body 1 in an exact carriage guide, a wedge-shaped ledge 3 providing for an exact fit of the slide and the guide. A clamping screw 4 serves for fixing the cross slide in position. As shown in Figs. 1 and 2, the slide 2 may be formed with a plurality of bores for the tool extending in parallel to the axis or in radial direction. Screws 7 (Fig. 3) serve for fixing the tool in position in the slide.

A check screw 6 provided in the slide 2 projects into a longitudinal groove 5 of limited length formed in the body 1 and thereby prevents the slide tool from being shifted beyond an admissible limit.

Displacement of the slide is effected by means of the spindle 11, one half of which is mounted directly in the body 1, the other half in the cap 13 fixed in position by means of a screw 12. On the spindle 11 is mounted a nut 10 which is fixed to the slide 2 by a screw 9. On the head of spindle 11 is mounted a square 8, which enables the spindle to be rotated by means of a socket wrench, and an adjustable graduated ring 14 which can be clamped in any desired position by means of an axial screw 15 and three radial bolts 16 without the zero point of the spindle, which is required for centrifugal adjustment, being changed. The conical points of the bolts 16 coact with the conical point of the set screw 15.

On the spindle 11 is further mounted a toothed rim 17, which is operatively connected with a gear 20 rigidly connected with a coaxially mounted star wheel 21. The star wheel 21 is sunk in the circularly ground slide of the body 1. On this slide is guided for concentric movement a feed ring 23 provided with fingers 25 which are arranged to coact with the teeth of the star wheel 21 and project axially beyond the slide 22.

Cutter heads or chucks as described are known in the art. According to this invention now the finger or fingers 25 are arranged on the feed ring 23 for displacement and are so shaped that they are able to take up, apart from a neutral middle position, in which they do not act on the wheel 21, also two final positions, in one of which they act on the upper, and in the other one on the lower teeth of the star wheel so that this wheel is imparted rotation in one or the other sense.

The feeding ring 23 is formed with indentures at three points of its circumference, so that at these points it is formed for instance with a semi-circular profile, as shown on the right hand side of Figs. 1 and 2. On this semi-circular part of the ring is mounted a semi-circular finger 25, which is shown in Fig. 1 in the neutral middle position, in Fig. 2 in one of its end positions, in which it engages the upper teeth of the star wheel 21. The rear face of the finger is formed with three flat portions, on which acts a spring 26 to fix the ring in one of the three positions. Into a lateral slot of the finger 25 projects a press button 29 formed with a rack 70 meshing with the gear 31. On the other side of the gear is mounted another push button 28, which also engages the gear 31 by means of a rack 71.

In the middle (neutral) position of the finger 25 shown in Fig. 1 the two push buttons 28, 29 are at a level (Fig. 3). On the button 28 being depressed, the gear 31 causes the push button 29 to be lifted and carries by means of the pin 30 the finger 25 upwardly into the position shown in Fig. 2.

If the ring 23, which can easily be gripped by a fluted sleeve 27, is held in this position, then during each revolution of the body 1 a tooth of the star wheel 21 strikes the finger 25 and the star wheel is then turned through the distance between two teeth. This rotation is transmitted at a corresponding ratio through the gears 20, 19, 18, 17 on the spindle 21 and the nut 18 and slide 2 are shifted radially through a corresponding distance.

By depressing the button 29 the bottom end of finger 25 may be carried into the path of the teeth of the star wheel 21 and then causes the star wheel and the spindle 11 to be rotated in the opposite sense, whereby the slide 2 is shifted also in opposite sense.

The feed ring 23 is held in its position by an annular cover 33 which is held down on the body 1 by a ring nut 36. In the annular cover, which is formed with indentures 72 into which project the push buttons 28 and 29, a pin 37 carries a rockable driver 38 which in the normal position of Figs. 3 and 4 extends horizontally, but can be turned into vertical position as shown in Figs. 1 and 2. On the driver 38 acts from below a pressure plate 39 controlled by springs 40 which holds the driver in one of its two positions. In the upright position the driver projects so far that it will strike any stop, such as 42, fixed on the machine. In that case the driver 38 and stop 42 automatically prevent the feed ring 23 from rotating and the cross slide 2 is then fed automatically. When the cross slide 2 has reached one of its end positions with the pin 6 reaching the end of the groove 5, the resistance to movement increases, however the driver 38 can now give way by moving into its position of rest against the action of the spring 40.

An oil hole 43, through which all parts of the chuck can be lubricated, is closed by a screw 41.

The extent of the cross feed can be varied by providing two or three fingers 25 so that either one or two or three fingers can be made to act on the star wheel, whereby during a revolution of the chuck the star wheel is fed either by one or two or three teeth.

I wish it to be understood that I do not desire to be limited to the exact details of construction shown and described for obvious modifications will occur to a person skilled in the art.

I claim:

1. A tool head comprising a rotary body, a spindle mounted on said body, a cross slide mounted for longitudinal reciprocation on said spindle, a feed wheel operatively connected with said spindle, a feed ring adapted to be maintained stationary with respect to said rotary body, said feed ring comprising at least one feed rocker, such feed rocker including two fingers extending in opposite directions, said fingers being disengaged from said feed wheel in the medium position of said rocker, and means for rocking said rocker in either direction whereby to bring either finger into engagement with said feed wheel so as to turn the same in one or the other direction.

2. A device according to claim 1, wherein the means for rocking said feed rocker comprise push buttons adapted to move the rocker from its medium position in either direction, and to thereby cause the fingers to engage the upper or lower portion of the feed wheel, respectively.

3. A device according to claim 1, comprising a plurality of feed rockers arranged along the circumference of the feed ring, whereby to control the speed of the feed action on the cross slide in accordance with the number of feed rockers rendered operative with respect to said feed wheel.

4. A device according to claim 1, comprising a stationary stop and a corresponding stop provided on said feed wheel, one of said stops being mounted for displacement out of contact with the other stop.

EMIL WOHLHAUPTER.